Patented Aug. 16, 1932

1,871,821

UNITED STATES PATENT OFFICE

PAUL NAWIASKY AND ARTUR KRAUSE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

DYESTUFFS OF THE ANTHRAQUINONE SERIES

No Drawing. Application filed December 10, 1930, Serial No. 501,463, and in Germany December 16, 1929.

The present invention relates to dyestuffs of the anthraquinone series suitable for dyeing cellulose esters and ethers.

We have found that cellulose esters and ethers are dyed especially deep blue to violet shades by applying to the said cellulose derivatives anthraquinone derivatives corresponding to the general formula:

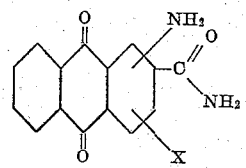

in which X stands for one of the auxochrome groups —$NH_2$ and —OH, and in which the hydrogen atoms of the —$NH_2$ may be replaced by alkyl or aryl radicles. The new dyestuffs may be prepared by methods already known. For example the initial materials may be amino-anthraquinone carboxylic acid and derivatives thereof and these may be converted into the carboxylic amides, or the initial materials may be anthraquinone carboxylic acid amides and amino groups and if desired further substituents may be introduced into these by the customary methods. In some cases the introduction of the amino groups and the preparation of the carboxylic acid amides may be combined in one operation. Finally, nitriles of aminoanthraquinones may be initial materials and these may be converted into carboxylic acid amides. The resulting dyestuffs may be used for dyeing in the usual manner, as for example in solution or suspension, if desired in the presence of emulsifying agents such as Turkey red oils.

The following examples will further illustrate the nature of this invention, but the invention is not restricted to these examples. The parts are by weight.

Example 1

10 parts of 1-aminoanthraquinone-2-carboxylic acid chloride (obtained for example by the action of thionyl chloride on 1-aminoanthraquinone-2-carboxylic acid in nitrobenzene at 100° C.) are triturated finely with 100 parts of 20 per cent aqueous ammonia solution and heated for a short time on the water-bath. The crude product, worked up in the usual manner by filtration may be purified by crystallization from mono-chlorbenzene. It then forms red needles having a melting point of from 288° to 289° C.

10.6 parts of the 1-aminoanthraquinone-2-carboxylic acid amide thus obtained are dissolved in 100 parts of concentrated sulphuric acid, 2 parts of paraformaldehyde are added and after some time the whole is cooled to 5° below zero centigrade. 5 parts of a mixture of concentrated sulphuric and nitric acids containing 52 per cent of nitric acid are then introduced and the whole is stirred at 5° below zero centigrade until the nitration is completed. When all the nitric acid has been used up the reaction mixture is poured into ice-cold water and the crude product thus precipitated is filtered off by suction and washed until neutral. It may be purified by crystallization from nitrobenzene and then forms red brown needles having a melting point of from 285° to 289° C.

The reduction is preferably effected by boiling for about an hour with an excess of sodium sulphide solution. The aqueous paste obtained by filtration and washing may be directly employed for the dyeing of acetate silk without further treatment. The 1.4-diaminoanthraquinone-2-carboxylic acid amide thus obtained corresponding to the formula:

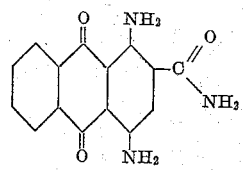

yields powerful blue dyeings on acetate silk while 1.4-diamino-anthraquinone itself dyes red violet shades.

Example 2

10 parts of 1-methylaminoanthraquinone-2-nitrile (obtained for example by the action of cuprous cyanide on 1-methylamino-2-bromoanthraquinone in pyridine) are dissolved in 100 parts of concentrated sulphuric acid. After cooling to 5° below zero centigrade, 7.5 parts of a mixture of concentrated sulphuric and nitric acids containing 52 per cent of nitric acid are added and the whole is kept at the said temperature until the nitric acid has been used up. The nitration product is precipitated by pouring into ice-cold water, filtered and washed until neutral. The reduction can be effected by vatting or boiling with an excess of sodium sulphide solution.

The resulting dyestuff corresponding to the formula:

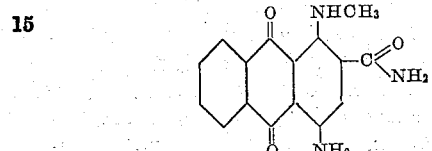

yields greenish blue dyeings on acetate silk, while the unsubstituted 1-methylamino-4-aminoanthraquinone dyes acetate silk blue violet shades.

*Example 3*

10 parts of 4-nitro-1-hydroxyanthraquinone-2-carboxylic acid chloride (in the form of yellow needles having a melting point of from 227° to 228° C. obtained for example by nitration of 1-hydroxyanthraquinone-2-carboxylic acid in monohydrate in the presence of boric acid and treatment of the 4-nitro-1-hydroxyanthraquinone-2-carboxylic acid thus obtained with thionyl chloride in nitrobenzene at 90° C. until the cessation of the evolution of hydrogen chloride) are triturated finely with 100 parts of a 20 per cent aqueous solution of ammonia and heated for a short time on the water-bath. 100 parts of a 14 per cent aqueous solution of commercial sodium sulphide are then added and the whole is boiled for about 1 hour. The reduction product is precipitated by acidification with bisulphite and worked up as described in Example 1. It crystallizes from nitrobenzene in the form of blue-violet needles having a melting point of 287° C. It corresponds to the formula:

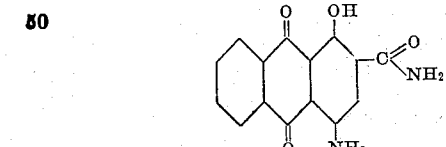

and dyes acetate silk violet shades while the unsubstituted 1-amino-4-hydroxyanthraquinone gives red dyeings.

*Example 4*

10 parts of 1-amino-4-nitroanthraquinone-2-carboxylic acid are heated at about 100° C., while stirring, in 100 parts of nitrobenzene with 10 parts of thionylchloride until a sample does not anymore dissolve when shaken with aqueous ammonia. The reaction mixture is then allowed to cool, the precipitate filtered off and washed with petrol ether and ether. The 1-amino-4-nitroanthraquinone-2-carboxylic acid chloride thus obtained forms brown needles melting at about 238° to 239° C.

In order to convert the said chloride into the acid amide the finely divided acid chloride is treated with aqueous ammonia until a sample does not anymore dissolve in a hot dilute solution of caustic soda. By reduction of the nitro group in the 4-position by boiling with a solution of sodium sulphide or by vatting 1.4-diaminoanthraquinone-2-carboxylic acid amide which is identical with respect to its chemical and tinctorial properties with the product described in Example 1, is obtained.

*Example 5*

10 parts of 1-amino-4-p-toluenesulphamidoanthraquinone-2-carboxylic acid are converted into the corresponding acid chloride by a treatment with 10 parts of thionyl chloride in 100 parts of nitrobenzene in the manner described in the foregoing example. From the said acid chloride the corresponding acid amide is obtained by a treatment with aqueous ammonia at about 100° C. By dissolving the said acid amide in concentrated sulphuric acid the toluene sulphonic acid radicle is split off and the 1.4-diaminoanthraquinone-2-carboxylic acid amide is obtained in the form of a blue paste by pouring the solution into water and filtering off the precipitate. The dyestuff is identical with that obtained according to Example 1.

By treating the aforesaid acid chloride with aniline instead of with aqueous ammonia and splitting off the toluene sulphonic acid radicle the corresponding acid anilide of the formula:

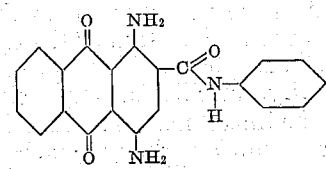

is obtained.

Likewise by the action of an aqueous solution of methyl-amine instead of aqueous ammonia and splitting off the toluene sulphonic acid radicle the corresponding acid methylamide of the formula:

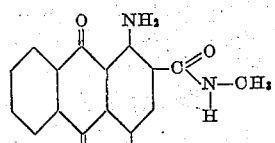

is obtained.

*Example 6*

10 parts of 1-amino-4-cyclohexylaminoanthraquinone-2-nitrile are introduced at about 40° C. into 100 parts of sulphuric acid of 90 per cent strength and treated at the said temperature until the nitrile radicle is saponified to the carboxylic acid amide group. After cooling, the dyestuff is recovered by pouring the reaction mixture into water and filtering off the precipitate. It forms a blue paste. The 1-amino-4-cyclohexylaminoanthraquinone-2-carboxylic acid amide furnishes on acetate silk strong greenish blue dyeings of very good fastness properties, in contradistinction to the nitrile which has nearly no dyeing properties.

What we claim is:—

1. As new articles of manufacture dyestuffs suitable for dyeing cellulose esters and ethers corresponding to the formula:

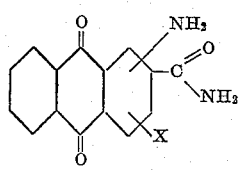

in which X stands for one of the auxochrome groups —$NH_2$ and —OH, in which dyestuffs the hydrogen atoms of the —$NH_2$ groups may be substituted by alkyl or aryl radicles.

2. As new articles of manufacture dyestuffs suitable for dyeing cellulose esters and ethers corresponding to the formula:

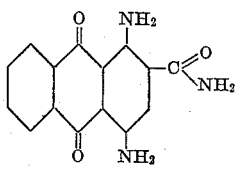

in which the hydrogen atoms of the $NH_2$ groups may be substituted by alkyl or aryl radicles.

3. As a new article of manufacture the dyestuff suitable for dyeing cellulose esters and ethers corresponding to the formula:

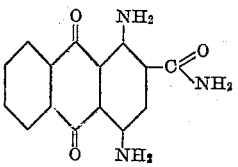

dyeing acetate silk blue shades.

4. As a new article of manufacture the dyestuff suitable for dyeing cellulose esters and ethers corresponding to the formula:

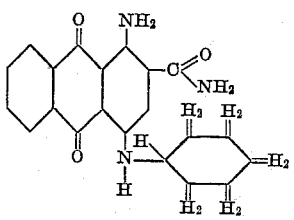

dyeing actate silk strong greenish blue shades.

In testimony whereof we have hereunto set our hands.

PAUL NAWIASKY.
ARTUR KRAUSE.